United States Patent
Rasmussen et al.

(10) Patent No.: US 7,496,611 B2
(45) Date of Patent: Feb. 24, 2009

(54) DISAMBIGUATING GLOBALLY UNIQUE IDENTIFIERS AFTER DUPLICATION

(75) Inventors: David J. Rasmussen, Redmond, WA (US); Simon P. Clarke, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 205 days.

(21) Appl. No.: 11/108,205

(22) Filed: Apr. 18, 2005

(65) Prior Publication Data

US 2006/0235894 A1    Oct. 19, 2006

(51) Int. Cl.
G06F 12/00 (2006.01)
G06F 17/30 (2006.01)

(52) U.S. Cl. .................. 707/203; 707/201; 707/205
(58) Field of Classification Search .................. None
See application file for complete search history.

(56) References Cited

U.S. PATENT DOCUMENTS

2005/0102289 A1* 5/2005 Sonoda et al. ................ 707/10
2006/0294039 A1* 12/2006 Mekenkamp et al. .......... 707/1

* cited by examiner

*Primary Examiner*—John R. Cottingham
*Assistant Examiner*—Mariela D Reyes
(74) *Attorney, Agent, or Firm*—Merchant & Gould (57) ABSTRACT

Methods, systems, and computer program products disambiguate a globally universal identifier (GUID) within a file after the file is duplicated. The method involves generating a GUID for the file, generating a location identifier that defines a unique location of the file when the GUID was generated, and storing the location identifier in association with the GUID. The method also involves opening and examining the file, determining whether the location identifier matches a current location of the file, and in response to determining that the location identifier does not match the current location, generating a new GUID and replacing the GUID with the new GUID. Additionally, the method may also involve remapping references mapped to the GUID in the file to the new GUID and resetting the location identifier to match the current location.

16 Claims, 4 Drawing Sheets

DISAMBIGUATING GLOBALLY UNIQUE IDENTIFIERS AFTER DUPLICATION

TECHNICAL FIELD

The present invention generally relates to preserving the uniqueness of a globally unique identifier (GUID), and more particularly, is related to methods, systems and computer program products for disambiguating GUIDS after duplication in a file system.

BACKGROUND

GUIDs are "Globally Unique Identifiers". They are used in many (almost all) applications for all kinds of purposes. They are often stored in files with objects when the application needs to definitively identify that object and be able to recall exactly the right one for future purposes. GUIDs are generated by a well-known process that is intended to guarantee their uniqueness across space and time. In theory it is impossible for a machine that follows the GUID algorithm to generate a GUID that has already been generated by another machine or by the same machine at another time. This guarantees uniqueness. However, there are still circumstances where GUIDs can cease to be unique. For example, if a file that contains many GUIDs important to the application (e.g. a document with GUIDs for each object in the document) is copied by the user in the file system to a different folder. It then becomes possible to have two files (the two copies) that could diverge over time, and hence represent different entities, that actually have the same GUIDs in them.

This causes many problems for the application. If the application now opens both documents and needs to find an object based on its GUID to perform an operation, then the application would face a situation where there are two identical "GUID"s that point to different entities and are therefore no longer unique. Resolving this is difficult.

Accordingly there is an unaddressed need in the industry to address the aforementioned deficiencies and inadequacies.

SUMMARY

Embodiments of the present invention provide methods, systems, and computer program products for disambiguating GUIDs after duplication. Embodiments of the present invention provide a means by which the uniqueness of GUIDs can be preserved even under file system copies and other operations that may duplicate the GUIDs.

One embodiment is a method for disambiguating a GUID within a file after the file is duplicated. The method involves generating a GUID for the file, generating a location identifier that defines a unique location of the file when the GUID was generated, and storing the location identifier in association with the GUID. The method also involves opening and examining the file, determining whether the location identifier matches a current location of the file, and in response to determining that the location identifier does not match the current location, generating a new GUID and replacing the GUID with the new GUID. Additionally, the method may also involve remapping references mapped to the GUID in the file to the new GUID and resetting the location identifier to match the current location.

Another embodiment is a computer program product including a computer-readable medium having control logic stored therein for causing a computer to disambiguate a GUID within a file after the file is duplicated. The control logic includes computer-readable program code for causing the computer to generate a GUID for the file, generate a location identifier that defines a unique location of the file when the GUID was generated, and store the location identifier in association with the GUID. The computer program product of claim 10, further comprising computer-readable program code for causing the computer to open and examine the file, determine whether the location identifier matches a current location of the file, and in response to determining that the location identifier does not match the current location, generate a new GUID and replace the GUID with the new GUID.

Still another embodiment is a computer-implemented system for preserving a uniqueness of a GUID within a file after the file is duplicated. The system includes a computing apparatus having a processor operative to generate a GUID for the file, generate a location identifier that defines a unique location of the file when the GUID was generated, and store the location identifier in association with the GUID. The processor is further operative to open and examine the file, determine whether the location identifier matches a current location of the file, and in response to determining that the location identifier does not match the current location, generate a new GUID and replace the GUID with the new GUID.

The invention may be implemented utilizing a computer process, a computing system, or as an article of manufacture such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION

Referring now to the drawings, in which like numerals represent like elements, various aspects of the present invention will be described. In particular, FIGS. 1-2 and the corresponding discussion are intended to provide a brief, general description of a suitable computing environment in which embodiments of the invention may be implemented. While the invention will be described in the general context of program modules that execute in conjunction with program modules that run on an operating system on a personal computer (PC), those skilled in the art will recognize that the invention may also be implemented in combination with other types of computer systems and program modules, such as a tablet PC and tablet operating system.

Generally, program modules include routines, programs, operations, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
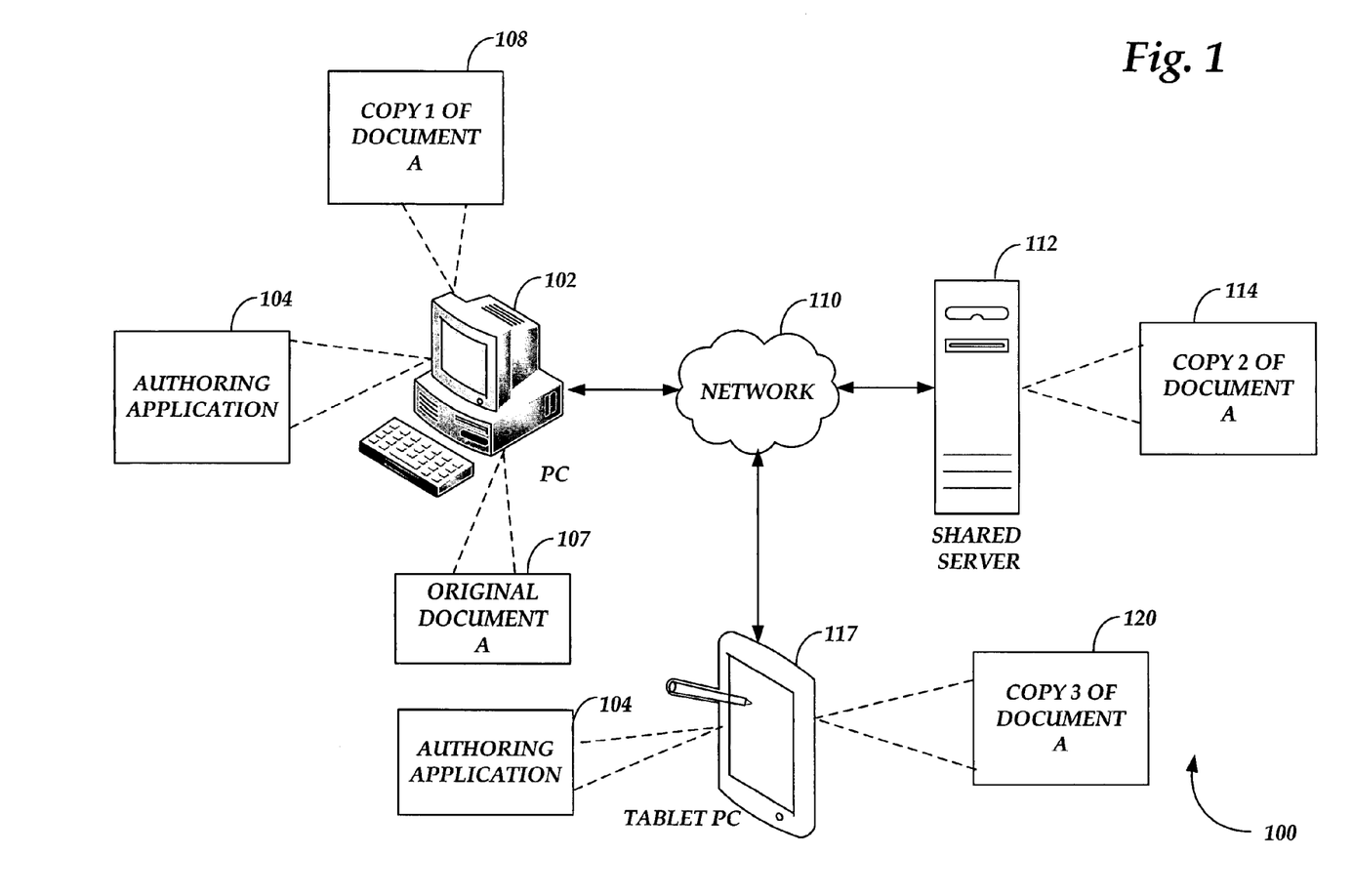
FIG. 1 is a block diagram illustrating client computing apparatuses, a server and a network architecture that provide an illustrative operating environment for illustrative embodiments of the present invention.

Referring now to FIG. 1, a block diagram, illustrating client computing apparatuses 102 and 117, a server 112, and a network architecture that provide an illustrative operating environment 100 for illustrative embodiments of the present invention will be described. The operating environment 100 includes the computing apparatuses 102 and 117, where each computing apparatus executes an authoring application (AA) 104, such as ONE NOTE from MICROSOFT CORPORATION of Redmond Wash. The computing apparatus 102 is operative to store an original document A 107 and a copy of the document A 108 at different locations within the computing apparatus 102. The computing apparatus 117, for example a tablet PC, is also operative to store a copy of the document A 120.

The operating environment 100 also includes the server 112 that adheres to a number of Internet and/or intranet protocol standards in communicating with the computing apparatuses 102 and 117 via the network 110, for example the Internet or an intranet network. The server 112 is also operative to store a copy 114 of the document A. The copy 114 of the document A may be shared between the computing apparatuses 102 and 117. The document A 107 and associated copies of the document A 107 include files associated with different sections of the document A 107, where each section is associated with a GUID and each GUID is associated with a location identifier. Additional details regarding disambiguating GUIDs after duplication or copying will be described below with respect to FIGS. 2-4.

Figure 2:
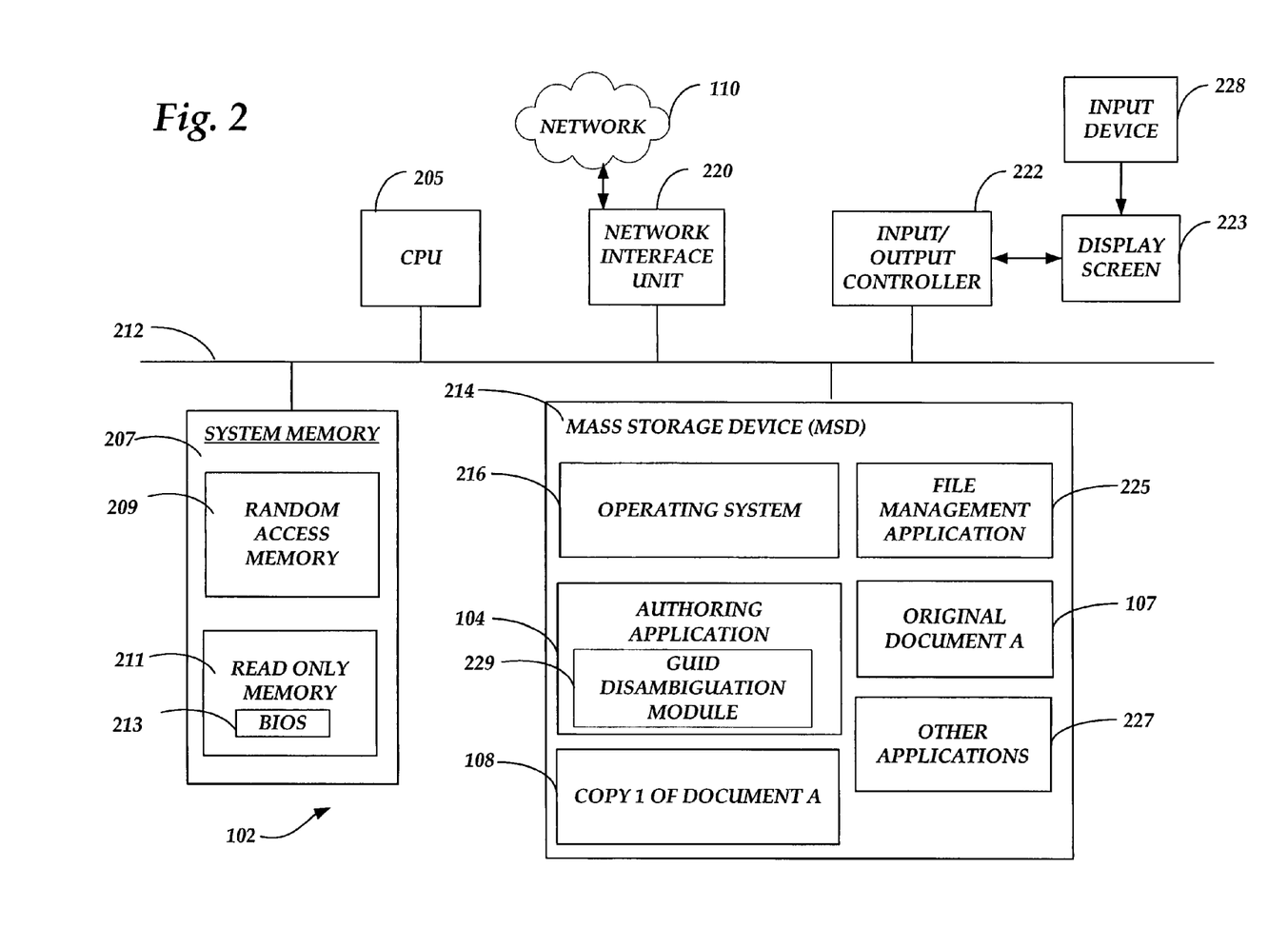
FIG. 2 is a computing system architecture illustrating a computing apparatus utilized in and provided by various illustrative embodiments of the invention.

FIG. 2 is a computing system architecture illustrating a computing apparatus 102 utilized in and provided by various illustrative embodiments of the invention. The computing apparatus 102 may be a standard personal computer (PC) or laptop with an input display, or a tablet PC that includes a central processing unit 205 ("CPU"), a system memory 207 including a random access memory 209 ("RAM") and a read-only memory ("ROM") 211, and a system bus 212 that couples the memory to the CPU 205. A basic input/output system 213 (BIOS) containing the basic routines that help to transfer information between elements within the computer, such as during startup, is stored in the ROM 211. The computing apparatus 102 further includes a mass storage device 214 for storing an operating system 216, application programs, and other program modules, which will be described in greater detail below.

The mass storage device (MSD) 214 is connected to the CPU 105 through a mass storage controller (not shown) connected to the bus 212. The mass storage device 214 and its associated computer-readable media provide non-volatile storage for the computing apparatus 102. Although the description of computer-readable media contained herein refers to a mass storage device, such as a hard disk or CD-ROM drive, it should be appreciated by those skilled in the art that computer-readable media can be any available media that can be accessed by the computing apparatus 102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVJS'), or other optical storage, magnetic cassettes, magnetic tape, magnetic disk storage or other magnetic storage devices, or any other medium which can be used to store the desired information and which can be accessed by the computing apparatus 102.

According to various embodiments of the invention, the computing apparatus 102 may operate in a networked environment using logical connections to remote computers through the network 110, such as the Internet or intranet. The computing apparatus 102 may connect to the network 110 through a network interface unit 220 connected to the bus 212. It should be appreciated that the network interface unit 220 may also be utilized to connect to other types of networks and remote computer systems. The computing apparatus 102 may also include an input/output controller 222 for receiving and processing input from a number of other devices, including a keyboard, mouse, or electronic stylus (not shown). Similarly, an input/output controller 222 may provide output to a display screen 223, a printer, or other type of output device. The input/output controller may also receive input via the display screen 223 by the use of a graphics tablet pen input device 228 utilized in conjunction with inking technology.

As mentioned briefly above, a number of program modules and data files may be stored in the MSD 214 and RAM 209 of the computing apparatus 102, including an operating system 216 suitable for controlling the operation of a networked personal computer, such as the WINDOWS XP operating system from MICROSOFT CORPORATION of Redmond, Wash. The mass storage device 214 and RAM 209 may also store one or more other program modules. In particular, the mass storage device 214 and the RAM 209 may store the AA 104. The AA 104 includes a GUID disambiguation module 229 operative to preserve the uniqueness of GUIDs after the files and/or documents containing the GUIDs have been duplicated.

According to one embodiment of the invention, the AA 104 and other application programs 227 may comprise the OFFICE suite of application programs from MICROSOFT CORPORATION including the WORD, EXCEL, and POWERPOINT application programs each of which may include the GUID disambiguation module 229. The other application programs 227 may also include a web browser application, such as INTERNET EXPLORER from MICROSOFT CORPORATION and an electronic mail application, such as OUTLOOK from MICROSOFT CORPORATION. The MSD 214 may also include a file management application 225. The file management application 225 can be used to copy a document containing GUIDs without the use of the application that authored the document.

Figure 3:
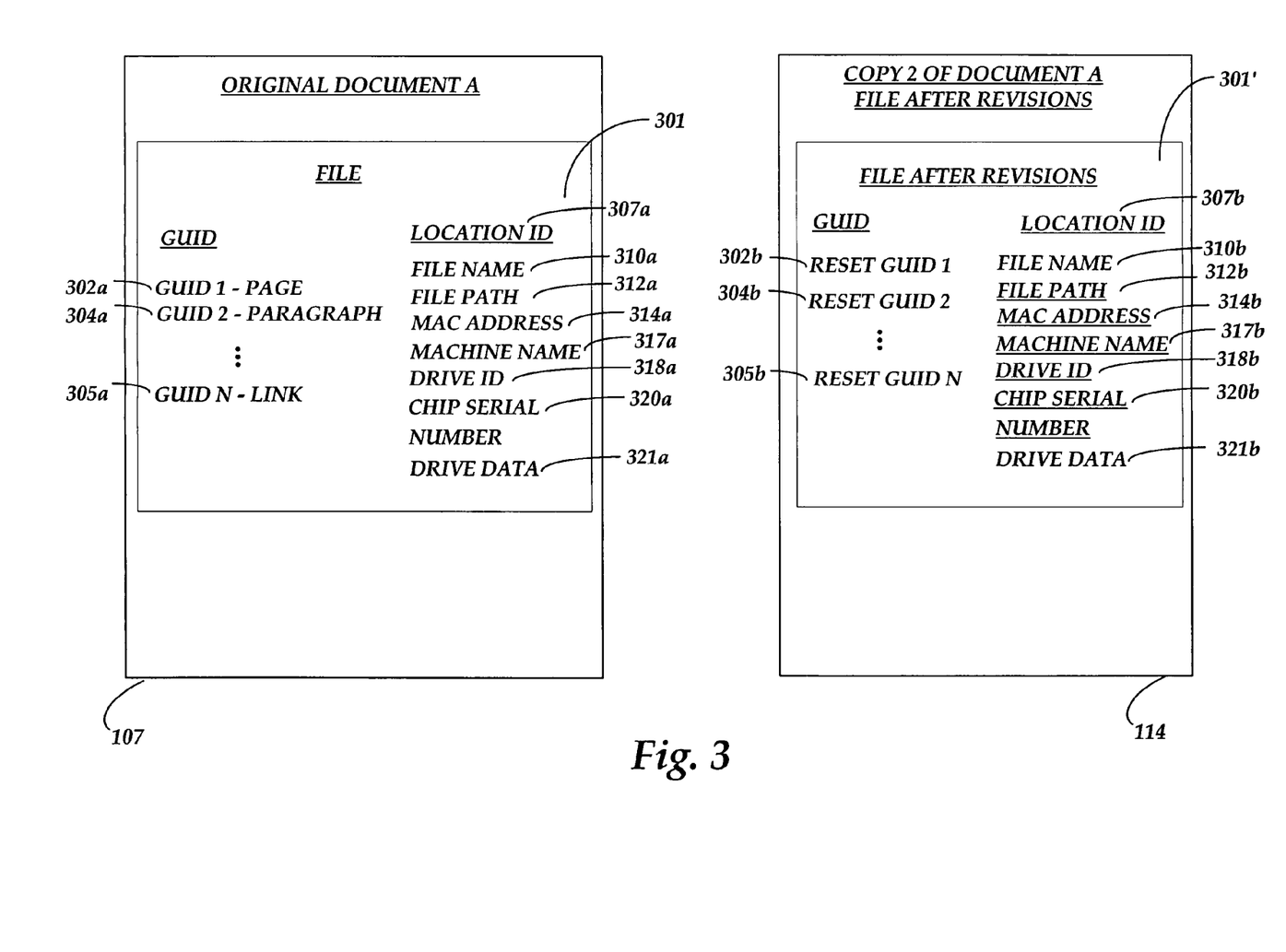
FIG. 3 is an illustration of an original document and a copy of the document both including files that contain GUIDs and associated location identifiers defining a unique location of the GUIDs according to an illustrative embodiment of the present invention.

FIG. 3 is an illustration of the original document A 107 and the copy 114 of the document A both including a file that contains at least one GUID and an associated location identifier defining a unique location of the GUID according to an illustrative embodiment of the present invention. The document A 107 includes a file 301 containing a GUID 302*a* representing a page within the document 107, a GUID 304*a* associated with a paragraph within the document 107, and a GUID 302*n* associated with an object link embedded in the document 107. The GUIDs associated with the document 107 as a whole or individually will also be associated with a location identifier, such as the location identifier 307*a*.

The location identifier 307*a* associated with the GUID 302*a* may have several parameters including a file name 310*a* of the file containing the GUID 302*a*, a file path 312*a* to the file 301, and a media access control (MAC) address of the computing apparatus 102 where the file 301 resides. The location identifier 307*a* may also include a machine name 317*a* for the computing apparatus 102, a drive identifier 318*a* identifying the drive upon which the file 301 is stored, a chip serial number 320*a* identifying a chip where the file 301 is stored, and data 321*a* describing aspects of the drive, for example the size of the drive 214 where the file 301 is stored.

Whenever an application that is interested in the GUIDs opens the file 301 it checks that the location identifier 307*a* of the file matches the actual current location from which it was opened. If the location identifier does not match, then the application can assume the file was copied or moved by a method other than an authoring application employing the GUID disambiguation module 229. These other methods would most commonly include the user copying or moving a file using the file system and the file explorer. In this case, the application proceeds to find all GUIDs in the file and generates new GUIDs to replace them all. This guarantees that even if the file was copied the GUIDs are reset to unique identifiers and the application can proceed to use them under the assumption that they are unique.

It should be appreciated that if an authoring or owning application employing the GUID disambiguation module 229 were to move or copy a file, the GUID disambiguation module 229 would have correctly modified the location IDs (in a move) or would have correctly modified both the location IDs and the GUIDs in a copy. It would not be possible for mechanisms such as file explorers to disambiguate the GUIDs and location IDs on a move because the structure and content of the files is opaque to file explorers. Hence the need for the present invention is evident such that an application can recover when files owned or authored by the application are moved or copied by other methods.

Thus accordingly, the copy 114 stored on the server 112 includes a file 301' containing one or more new GUIDs 302*b*, 304*b*, and 305*b*, generated after the disambiguation module 229 discovers that the location ID 307*a* did not match the actual current location of the file 301'. The location identifier 307*a* has also been reset to a location identifier 307*b* where at least some of the parameters have been changed (denoted by underlining) to match the current location of the file 301'. For instance, the file path 312*a* has been changed file path 312*b* to define the file path to the server 112 and the MAC address 314*a* has been changed to 314*b* to match the server 112. Other parameters are changed to match the current location accordingly. It should be appreciated that multiple GUIDs in a file can each have an individual location ID or two or more GUIDs can share the same location ID. Sharing the same location ID enables the disambiguation module 229 the opportunity to save space and reduce the number of location ID confirmations (see operation 414 of FIG. 4). Additional details regarding the process of enforcing uniqueness of GUIDs will be described below with respect to FIG. 4.

Figure 4:
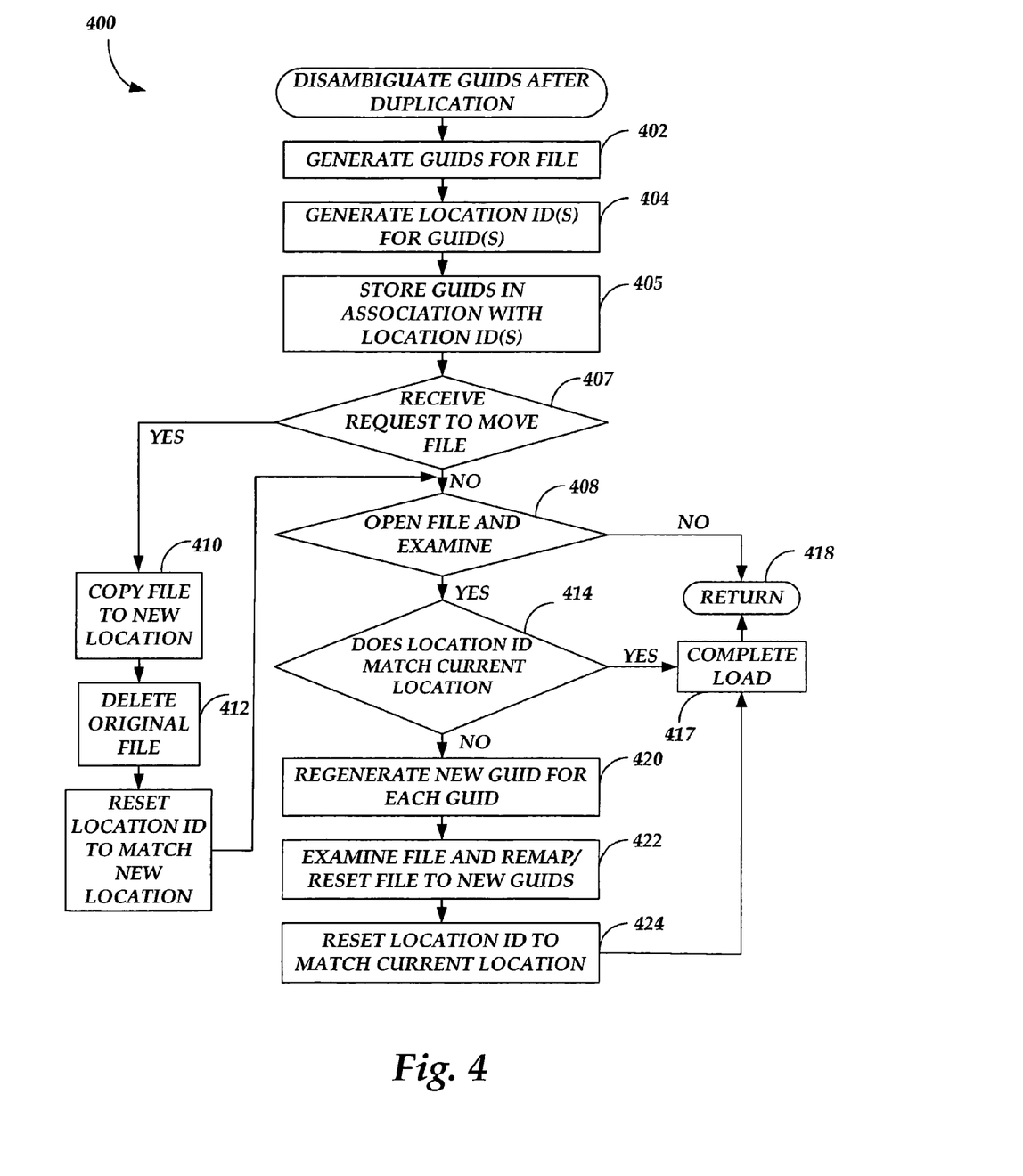
FIG. 4 is an operational flow diagram illustrating operations performed in disambiguating a globally universal identifier (GUID) within a file after the file is duplicated according to an illustrative embodiment of the present invention.

FIG. 4 is an illustrative routine or operational flow performed in disambiguating a globally universal identifier (GUID) within a file after the file is duplicated according to illustrative embodiments of the invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 4, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

FIG. 4 is an operational flow diagram 400 illustrating operations performed in disambiguating a globally universal identifier (GUID) within a file after the file is duplicated according to an illustrative embodiment of the present invention. The operational flow 400 begins at operation 402 where the AA 104 generates one or more GUIDs associated with a file. The GUIDs may be associated with different sections of a document, such as the document A 107 (FIG. 3). The actual process of initially generating GUIDs is known in the art.

Next, at operation 404, the AA 104 generates location identifiers for each GUID, or for groups of GUIDs. Next at operation 405 the computing apparatus 102 stores the GUIDs in association with the location identifier(s). Next the operational flow 400 continues to detect operation 407 where a determination is made as to whether a request to move the file containing the GUID(s) has been received. If a request to move has not been received, the operational flow 400 continues to operation 408 described below. If a request to move the file has been received, the operational flow continues from detect operation 407 to operation 410.

At operation 410, the AA 104 copies the file to a new location. This location can be within the computing apparatus 102 or on a different computing apparatus, such as the server 112 or the tablet PC 117. Next at operation 412, the AA 104 deletes the original file from the original location. Then at operation 413, the computing apparatus resets the location identifier to match the new location. The operational flow 400 then continues from operation 413 to operation 408. It should be appreciated that when the file is moved without the use of the AA 104, an application examining the file may treat the file as a copied document instead of a moved document.

At operation 408, a determination is made as to whether the file is being opened to begin loading the file. This could possibly take place when the AA 104 or another application equipped with the GUID disambiguation module 229 opens a document and is interested in GUIDs. If the file is not being opened and examined, the operational flow 400 continues to return operation 418 where control is passed to other operations.

If the file is being opened and examined, the GUID disambiguation module 229 determines whether the location identifier (ID) matches the current location of the file at operation 414. If the location ID matches the current location, the operational flow 400 continues from operation 414 to operation 417 where the AA 104 completes loading of the file. If the location ID does not match the current location, the operational flow 400 continues from operation 414 to operation 420.

At operation 420, the GUID disambiguation module 229 generates a new GUID for each GUID having a location ID that does not match a current location of the file. Next, at operation 422, GUID disambiguation module 229 examines the file and remaps the file to the new GUID(s) where the file had been mapped to the previous GUID(s). Then at operation 424, the GUID disambiguation module 229 resets the location ID for each new GUID to match the current location. The operation flow 400 then continues to operation 417 described above.

Based on the foregoing, it should be appreciated that the various embodiments of the invention include methods, systems, and computer-readable mediums for disambiguating a globally universal identifier (GUID) within a file after the file is duplicated. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer implemented method for disambiguating a globally universal identifier (GUID) within a file after the file is duplicated, the method comprising:

generating a GUID for the file, wherein the file is located on a client computing apparatus;

generating a location identifier that defines a unique location of the file on the client computing apparatus when the GUID was generated, wherein the location identifier comprises a plurality of parameters, the plurality of parameters comprising: a file name of the file containing the GUID, a file path of the file, a media access control (MAC) address of a machine where the file is located, a name of the machine, a drive identifier identifying a drive on which the file is stored, a serial number of a chip where the file is located, and a size of the drive where the file is stored;

storing the location identifier in association with the GUID on the client computing apparatus;

opening and examining the file to load the file on the client computing apparatus, wherein opening the file to load the file on the client computing apparatus comprises at least one of: opening a file copied to a different location on the client computing apparatus from within an authoring application executed on the client computing apparatus and opening a file moved to a different location on the client computing apparatus from within an authoring application executed on the client computing apparatus, the authoring application comprising a disambiguation module for disambiguating the GUID;

determining whether the location identifier matches a current location of the file on the client computing apparatus; and in response to determining that the location identifier does not match the current location, generating a new GUID and replacing the GUID with the new GUID on the client computing apparatus.

2. The method of claim 1, further comprising remapping references mapped to the GUID in the file to the new GUID; and resetting the location identifier to match the current location.

3. The method of claim 1, further comprising:

copying the file to a new unique location on the client computing apparatus;

deleting the file from the unique location on the client computing apparatus; and resetting the location identifier to define the new unique location of the file on the client computing apparatus.

4. The method of claim 1, wherein generating the GUID comprises generating a GUID for each file associated with a document wherein files associated with the document include at least one of a page file, a paragraph file, and an object file.

5. The method of claim 1, further comprising loading the file in response to determining that the location identifier matches the current location.

6. A computer-readable storage medium having computer-executable instructions which, when executed by a computer, will cause the computer to perform a method of disambiguating a globally universal identifier (GUID) within a file after the file is duplicated, the method comprising:

generating a GUID for the file, wherein the file is located on the computer;

generating a location identifier that defines a unique location of the file on the computer when the GUID was generated, wherein the location identifier comprises a plurality of parameters, the plurality of parameters comprising: a file name of the file containing the GUID, a file path of the file, a media access control (MAC) address of a machine where the file is located, a name of the machine, a drive identifier identifying a drive on which the file is stored, a serial number of a chip where the file is located, and a size of the drive where the file is stored; and storing the location identifier in association with the GUID on the computer;

opening and examining the file, wherein opening the file comprises at least one of: opening a file copied to a different location on the computer from within an authoring application executed on the computer and opening a file moved to a different location on the computer from within an authoring application executed on the computer, the authoring application comprising a disambiguation module for disambiguating the GUID;

determining whether the location identifier matches a current location of the file on the computer; and in response to determining that the location identifier does not match the current location, regenerating a new GUID and replacing the GUID with the new GUID on the computer.

7. The computer-readable storage medium of claim 6 further comprising:

remapping references mapped to the GUID in the file to the new GUID; and resetting the location identifier to match the current location.

8. The computer-readable storage medium of claim 6 further comprising:

copying the file to a new unique location;

deleting the file from the unique location; and resetting the location identifier to define the new unique location of the file.

9. The computer-readable storage medium of claim 6, wherein generating the GUID comprises generating a GUID for each file associated with a document wherein files associated with the document include at least one of a page file, a paragraph file, and an object file.

10. A computer-implemented system for preserving a uniqueness of a plurality of globally universal identifiers (GUIDs) within a file after the file is duplicated, the system comprising:

a computing apparatus including a processor operative to:

generate a plurality of GUIDs for the file, wherein the file is included in a document and wherein each of the plurality of GUIDs generated for the file represents at least one of a page within the document, a paragraph within the document, and an object link embedded in the document;

generate a location identifier that defines a unique location of the file when the plurality of GUIDs were generated, wherein the location identifier comprises a plurality of parameters, the plurality of parameters comprising: a file name of the file containing the GUID, a file path of the file, a media access control (MAC) address of a machine where the file is located, a name of the machine, a drive identifier identifying a drive on which the file is stored, a serial number of a chip where the file is located, and a size of the drive where the file is stored; and store the location identifier in association with the plurality of GUIDs;

open and examine the file, wherein opening the file comprises at least one of: opening a file copied to a different location on the computing apparatus from within an authoring application executed on the computing apparatus and opening a file moved to a different location on the computing apparatus from within an authoring application executed on the computing apparatus, the authoring application comprising a disambiguation module for disambiguating the plurality of GUIDs;

determine whether the location identifier matches a current location of the file;

in response to determining that the location identifier does not match the current location, generate a new plurality of GUIDs and replace the plurality of GUIDs with the new plurality of GUIDs.

11. The system of claim 10, wherein the processor is further operative to:

remap references mapped to the plurality of GUIDs in the file to the new plurality of GUIDs; and reset the location identifier to match the current location.

12. The system of claim 11, further comprising a second computing apparatus wherein the processor operative to open the file to load the file is operative to perform at least one of the following:

open and examine a file copied from the second computing apparatus to the computing apparatus;

open and examine a file stored on the second computing apparatus wherein the file is shared between at least the computing apparatus and the second computing apparatus.

13. The method of claim 3, wherein resetting the location identifier to define the new unique location of the file on the client computing apparatus comprises changing at least one parameter to match the current location of the file, the at least one parameter comprising a new file system path of the file.

14. The system of claim 12, wherein the file moved to a different location on the computing apparatus without the use of the authoring application is examined as a copied file instead of a moved file.

15. The system of claim 11, wherein the processor in resetting the location identifier to match the current location is operative to change at least one parameter to match the current location of the file, the at least one parameter comprising a media access control (MAC) address of a machine where the file is currently located.

16. The system of claim 11, wherein the plurality of GUIDs generated for the file share the location identifier to save storage space on the computing apparatus and to reduce a number of iterations for determining whether the location identifier matches a current location of the file.

* * * * *

UNITED STATES PATENT AND TRADEMARK OFFICE
CERTIFICATE OF CORRECTION

| | | |
|---|---|---|
| PATENT NO. | : 7,496,611 B2 | |
| APPLICATION NO. | : 11/108205 | |
| DATED | : February 24, 2009 | |
| INVENTOR(S) | : David J. Rasmussen et al. | |

It is certified that error appears in the above-identified patent and that said Letters Patent is hereby corrected as shown below:

In column 7, line 60, in Claim 2, delete "comprising" and insert -- comprising: --, therefor.

Signed and Sealed this
Tenth Day of May, 2011

David J. Kappos
*Director of the United States Patent and Trademark Office*